May 20, 1958     H. M. VARNER     2,835,118
COUPLING
Filed Dec. 28, 1955

INVENTOR.
HORACE M. VARNER
BY
Oscar B Brumback
ATTORNEY

United States Patent Office 2,835,118
Patented May 20, 1958

2,835,118

COUPLING

Horace M. Varner, Short Hills, N. J., assignor to Bendix Aviation Corporation, Teterboro, N. J., a corporation of Delaware Application December 28, 1955, Serial No. 555,839

2 Claims. (Cl. 64—15)

This invention relates generally to couplings for shafts or other rotatable elements and more particularly to a coupling for interconnecting shafts which may not be coaxial.

An object of the present invention is to provide a novel coupling for connecting shafts which is simple and rugged in construction and easy to install in blind locations.

Another object is to provide a novel universal coupling which is light in weight and is not appreciably larger than the shaft.

A further object is to provide a novel coupling for two shafts which are arranged in end to end relationship but may not have their axes in the same straight line, the coupling requiring only that the ends of the shaft be slotted to accommodate the coupling; and the coupling, when assembled in the shafts, being maintained in assembled relationship therewith automatically.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description, and is not to be construed as defining the limits of the invention.

In the single sheet of drawing, wherein like parts are marked alike:

Figure 1:
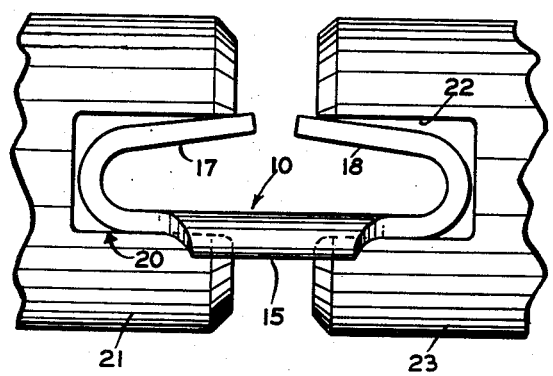
Figure 1 is a side view of the novel coupling of the present invention assembled in two shafts.
Figure 2:
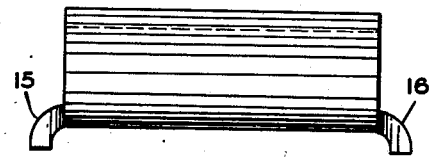
Figure 2 is an end view of the novel coupling of Figure 1.
Figure 3:
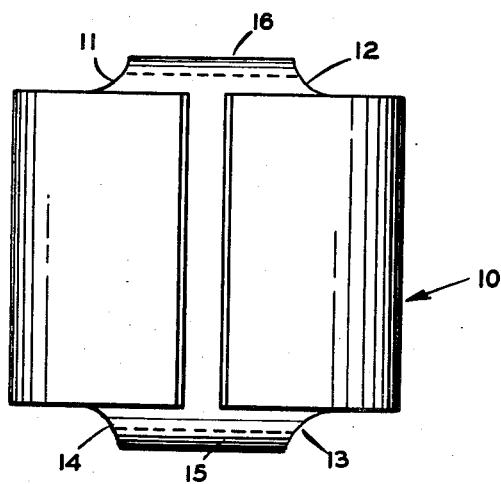
Figure 3 is a plan view of the novel coupling of Figure 1.

The novel coupling of the present invention is adapted to be constructed from a sheet of suitable metal, such as set out in the U. S. Federal Specification QQ–C–533 condition ½H, by simple stamping and bending operations. In forming the coupling, the side edges of an elongated, generally rectangular strip of sheet metal, denoted generally 10, are cut away or notched as at 11, 12, 13 and 14. The remaining material at the side edges is bent outwardly as at 15 and 16 to provide a retainer or lip portion to prevent lateral disengagement of the coupling by the shafts. Opposite end portions 17 and 18 of the sheet are bent inwardly at an acute angle to form engaging members for the shafts.

In assembling the coupling to connect the shafts, the novel coupling is first inserted in a transverse slot 20 in one shaft 21, the spring pressure of member 17 retaining the coupling in the slot. If the other shaft 21 be in a blind location, the assembled coupling and shaft 10, 21 need merely be pushed into the blind location so that member 18 of the coupling engages in the transverse slot 22 of shaft 23 whereupon the spring action of the member 18 holds the member in the slot 22.

After the coupling is assembled with the two shafts in the manner described above and shown in Figure 1, the torque produced by the rotation of one shaft is transmitted through the coupling to the other shaft. The spring action of members 17 and 18 in slots 20 and 22 give the coupling a substantial degree of resilience and enables the coupling to accommodate itself readily to any lateral or angular misalignment of the shafts. The flanged edges or lips 15 and 16 prevent lateral disengagement of the coupling and the shaft.

The foregoing has presented a novel coupling for two shafts which may not be axially aligned. The coupling is light, need not be appreciably larger than the shaft, and is inexpensive to manufacture. The coupling is adaptable for the coupling of shafts when one shaft may be in a blind location. The coupling requires only that the shaft be slotted laterally, no particularly fine milling being required.

Although but one embodiment of the invention has been illustrated and described, various changes can be made in the design and arrangement of the parts without departing from the spirit and scope of the invention as the same will now be understood by those skilled in the art.

I claim:

1. A device for drivably connecting two shafts having transverse slots therein and arranged in end-to-end relationship, comprising a coupling member extending axially between the two shafts, said coupling member including a sheet of material having end portions bent inwardly at an acute angle to form resilient members adapted to slidably engage in transverse slots in the adjacent ends of said two shafts and having end portions bent at an angle to form stops to prevent lateral disengagement of the coupling from the slots.

2. A device for drivably connecting two shafts having transverse slots therein and arranged in end-to-end relation, comprising a coupling member extending axially between the two shafts, said coupling member including a base, end members resiliently mounted on said base for slidably engaging in the transverse slots in the adjacent ends of said two shafts and members at the sides of said base for engaging said shafts to prevent lateral disengagement of said end members.

References Cited in the file of this patent

UNITED STATES PATENTS

| 2,643,528 | Hammarbach | June 30, 1953 |
| 2,724,251 | Weaver | Nov. 22, 1955 |